United States Patent [19]

Yamamoto et al.

[11] Patent Number: 5,075,145

[45] Date of Patent: Dec. 24, 1991

[54] OPTICAL RECORDING MEDIUM

[75] Inventors: Ryoichi Yamamoto; Takashi Yamada; Satoshi Matsubaguchi, all of Kanagawa, Japan

[73] Assignee: Fuji Photo Film Co., Ltd., Kanagawa, Japan

[21] Appl. No.: 502,799

[22] Filed: Apr. 2, 1990

[30] Foreign Application Priority Data

Apr. 7, 1989 [JP] Japan ................................. 1-88465
Apr. 12, 1989 [JP] Japan ................................. 1-92760

[51] Int. Cl.$^5$ .............................................. B32B 3/02
[52] U.S. Cl. ...................................... 428/64; 428/65; 428/209; 428/457; 428/913; 430/495; 430/945; 346/76 L; 346/135.1; 369/272
[58] Field of Search ........... 369/272; 346/72 L, 135.1; 430/495, 945; 428/64, 65, 209, 913, 457

[56] References Cited

U.S. PATENT DOCUMENTS

| | | | |
|---|---|---|---|
| 4,555,472 | 11/1985 | Katagiri et al. | 430/495 |
| 4,681,834 | 7/1987 | Simmons, III | 430/270 |
| 4,762,770 | 8/1988 | Bouldin et al. | 430/273 |
| 4,871,649 | 10/1989 | Imataki et al. | 430/270 |

*Primary Examiner*—Patrick J. Ryan
*Attorney, Agent, or Firm*—Sixbey, Friedman, Leedom & Ferguson

[57] ABSTRACT

An optical recording medium comprising a substrate and a metal reflective layer provided on the substrate, in which the metal reflective layer comprises an alloy of Al and at least one metal selected from the elements of Groups Ib, IIa, IVb, Vb, VIb, IIIa, IVa and Va of the Periodic Table.

12 Claims, No Drawings

OPTICAL RECORDING MEDIUM

FIELD OF THE INVENTION

The present invention relates to a optical recording medium and more particularly to characteristics of an optical recording medium with a metal reflective layer.

BACKGROUND OF THE INVENTION

In recent years, an optical recording medium has been widely used in large volume data files and the like as a medium capable of reading with laser light.

This optical recording medium includes an ROM type medium conducting only reproduction, such as a video disc, a compact disc and CD-ROM, a WO type medium capable of conducting additional recording, and a magneto-optical type or phase changeable type medium capable of conducting rewriting.

In the ROM type medium, information is formed in a substrate at a time of injection molding as a prepit, and a metal reflective layer is formed on the substrate as a thin layer in order to reflect light for reproduction.

In the WO type medium, information is recorded and reproduced utilizing the phenomenon that light transmission/reflective ratio characteristics vary with irradiation of laser light.

In the magneto-optical type medium in which rewriting can be freely carried out, information is recorded by heat magnetic reverse of a magnetic zone in a vertical magnetized film, and is reproduced by the Kerr effect. In the phase changeable type medium, recording and reproduction of information is effected utilizing a change in the light transmission/reflective ratio characteristics between a crystalline layer and an amorphous layer.

The shape or the light recording medium includes a compact disc medium of the one-side-recording type in which a optical recording layer, a protective layer and so on are provided on a substrate, and which is used as a single plate. A WO type medium, a magneto-optical type medium, a phase changeable type medium and so on of the double-side-recording type in which 3.5 inch magneto-optical discs and their media are bonded together by the use of an adhesive, are also included.

The above-described magneto-optical recording media are required to have a certain degree of reflectance because reproduction is conducted with laser light. In order to satisfy this requirement, a metal reflective layer in the form of a thin film is used in the ROM type medium. Even in the WO type medium, which uses a metal-based recording medium, a metal reflective layer is provided as a matter of course to obtain a suitable reflectance and to improve a signal quality.

Moreover, in the optical type recording medium, a metal reflective layer is used to improve a signal quality at a time of reading out.

It is important that a material for the above metal reflective layer to have a high light reflectance be useful in an optical recording medium. Au, Ag, Al, and the like are used for this.

Of these metals, Al is widely used from a viewpoint of cost. It is formed as a thin film on a substrate along with a recording layer, a protective layer and so on by a vacuum film forming method such as a sputtering method or a vacuum deposition method.

However, the durability of an Al reflective layer is low. That is, in the case of a one-side-recording type medium, oxygen or moisture directly from the air or permeating through a substrate and a protective layer causes oxidation and corrosion. This decreases the reflectance and breaks the thin film. Moreover, halogen and low molecular weight materials that remaining in a substrate and a protective layer made of an organic resin cause corrosion, thereby producing a problem particularly where long term durability is required.

Although the double-side-recording type recording medium provides better shielding from the air than the one-side-recording type recording medium, it inevitably suffers from the problems described above. Particularly in the case of the intimate contact structure in which two media are bonded together with an organic resin protective layer in the inside configuration, corrosion due to water permeating through an interface between the bonded media may occur. In addition, corrosion due to halogen and low molecular weight materials remaining in the adhesive produces a practically unneglegible problem.

In order to increase anti-corrosion properties of an Al reflective layer to be used in an optical recording medium, a method for making alloys of Al and various other elements have been proposed. For example, an alloy of Al and Si, Mg or Mn is used as a reflective film or layer of a magneto-optical recording medium to prevent a recording layer from deterioration due to oxidation (as described in JP-A-62-239349) (the term "JP-A" as used herein means an "unexamined published Japanese patent application); a method in which an alloy of Al and Si, Cr, Mg or Mn is used as a reflective film or layer of a magneto-optical recording medium, thereby preventing corrosion of the reflective film itself (as described in JP-A-62-295232); a method in which an alloy of Al and Ta is used as a reflective film of a magneto-optical recording medium, thereby preventing corrosion of the reflective film itself and a recording layer, and deterioration of characteristics (as described in Japanese Patent Application No. 63-78594 and JP-A-64-4938); and a method in which an alloy of Al and Ti is used for the same purpose as above (as described in JP-A-62-13774) have been proposed.

However, the methods in which the above aluminum alloys are used do not produce sufficiently satisfactory effects.

In addition, as a method of increasing anti-corrosion properties of an Al thin film against acid, amorphousizing an alloy of Al and Ta or Nb has been proposed (as described in JP-A-64-25934). However, this method does not produce satisfactory effects, because even if a film is produced by using bulky metal or by vacuum film forming, the thickness is greater than an Al thin film used in an optical recording medium by not less than one order of magnitude.

Consequently, an effective means to increase anti-corrosion properties of an Al reflective layer to be used in an optical recording medium has not been found.

In particular, no effective means has been proposed to prevent the corrosion characteristic of the intimate bonding structure of an Al reflective layer in a double-side-recording type optical recording medium using a hot melt adhesive or an organic resin protective layer so that corrosion due to halogen and low molecular weight materials remaining in an organic substance remains a problem.

SUMMARY OF THE INVENTION

An object of the present invention is to provide an optical recording medium having excellent weather resistance in which deterioration of the recording layer is prevented by increasing anti-corrosion properties of a metal reflective layer to be used in the optical recording medium.

The above object can be attained by providing an optical recording medium comprising a substrate and a metal reflective layer provided on a substrate, in which the metal reflective layer comprises an alloy of Al and at least one metal selected from the elements of Groups Ib, IIb, IVb, Vb, VIb, IIIa, IVa and Va of the Periodic Table.

The present invention relates to an optical recording medium comprising a substrate and a metal reflective layer provided on a substrate, in which the metal reflective layer comprises an alloy of Al and at least one metal selected from the elements of Groups Ib, IIb, IVb, Vb, VIb, IIIa, IVa and Va.

DETAILED DESCRIPTION OF THE INVENTION

In the optical recording medium of the present invention, the metal reflective layer comprises an alloy of Al and at least one metal selected from the elements of Groups Ib, IIb, IVa, Vb, VIb, IIIa, IVa and Va of the Periodic Table. It has been discovered that the passive state of a reflective layer formed by the aluminum alloy is stronger than that of the aluminum alone, and that the alloy reflective layer has greatly increased anti-corrosion properties.

Therefore, this metal reflective layer is rarely corroded, a reduction in reflectance with the passage of time is small, the protective effect of a recording layer formed on a substrate is increased, deterioration in characteristics of the recording layer is prevented, and the weather resistance of an optical recording medium is increased.

In particular, when an organic resin protective layer is provided on a metal reflective layer, the optical recording medium of the present invention exhibits excellent effects.

That is, the commonly encountered problem of oxidation and corrosion due to oxygen, water and so on in the air, as well as the problem of corrosion of the metal reflective layer due to halogen and low molecular weight material remaining in the organic resin protective layer are solved in the optical recording medium of the present invention.

In a double-side-recording type optical recording medium in which two optical recording media formed by providing an organic resin protective layer on the above-described metal reflective layer are coated with a hot melt adhesive and bonded together, the influences of reaction residues such as halogens in the resin component of the hot melt adhesive and low molecular weight material are increased. Therefore, the advantages of the optical recording medium of the present invention are even more effective.

In the conventional optical recording medium, as a matter of course, the corrosion problems of the metal reflective layer increases bit error rate. In addition, noise in the lower region of number of recording frequency is increased, and reduction of S/N and narrowing of a phase margin of the medium are produced. Use of the optical recording medium of the present invention considerably improves these problems. This result is achieved because the metal reflective layer of the optical recording medium of the present invention produces, as described above, a strong passive state on the surface.

Of the elements of Groups Ib, IIb, IVb, Vb, VIb, IIIa, IVa and Va of the Periodic Table, the elements of Nb, Zr, V, Mo, Hf, W, Au, Zn, In, Si, Pb, P, Sb and Bi are particularly effective.

When the metal reflective layer contains at least one element selected from the group consisting of Nb, Zr, V, Mo, Hf, W and Au, preferably Nb, Mo, W and Zr, the proportion of the element is generally 0.5 to 20 atomic percents (%), and preferably 1.0 to 10 atom %.

When the metal reflective layer contains at least one element selected from the group consisting of Zn, In, Si, Pb, P, Sb and Bi, preferably Zn, In and P, the proportion of the element is generally 0.3 to 15 atom %, and preferably 1.0 to 10 atom %.

If the proportion of the element other than Al is small, the increase in anti-corrosion properties is small, heat conductivity is too high and sensitivity is low. If the proportion is too large, the reflectance of the metal reflective layer is undesirably decreased.

The metal reflective layer in the optical recording medium of the present invention is effective even in a metal reflective layer containing a metal other than Al as a major component. For example, in Fe-based alloys, Cu-based alloys, Ni-based alloys, Ti-based alloys and Cr-based alloys, the same effects as described above can be expected.

The metal reflective layer of the optical recording medium of the present invention is usually formed by a vacuum film forming method. In general, a sputtering method and a vacuum deposition method could also be employed.

For example, in the case of the sputtering method, a magnetron sputtering method using Rf (radio frequency) and DC (direct current) power is desirable, and in the case of the vacuum deposition method, a deposition method of the heating system using an EB (electric beam) gun is desirable.

When the optical recording medium of the present invention is a reflective type of optical disc, the metal reflective layer is directly formed on the surface of a substrate with group grooves.

When it is a WO type medium or a magneto-optical recording medium, the metal reflective layer is formed on the uppermost layer formed by laminating a recording layer and a dielectric protective layer. When it is a magneto optical recording medium of the double-side-recording type, an organic resin protective layer of, for example, an ultraviolet hardening resin is further provided on the metal reflective layer. As a matter of course, even if the organic resin protective layer is formed, the features and advantages of the optical recording medium of the present invention are not lost.

Accordingly, in the case of the double-side-recording type magneto optical recording medium, the hot melt adhesive is coated directly on the metal reflective layer or it is coated on the top surface of the organic resin protective layer. Two magneto-optical recording media are then bonded together so that the substrate is on the outside and the metal reflective layer is on the inside.

Ho melt adhesives which can be used include synthetic rubber-based, EVA-based, acryl-based, and polyamide-based resins. Of these, synthetic rubber-based and polyamide-based resins are preferred.

The thickness of the metal reflective layer is generally 200 to 2,000 Å and preferably 220 to 800 Å.

As materials for the substrate to be used in the optical recording medium of the present invention, polycarbonate, polymethyl methacrylate, epoxy, polyolefin, glass and the like can be used. When a substrate made of polycarbonate, polymethyl methacrylate, epoxy or polyolefin, for example, is used, the features of the optical recording medium of the present invention are most effectively exhibited.

Of the above resin substrates, a polycarbonate substrate has advantages in that water absorption is small and glass transition temperature is high, and thus is preferably used in the optical recording medium of the present invention.

When the light recording medium of the present invention is a magneto-optical recording medium, a thin film of various oxide and metallic magnetic substances is used as a recording layer. For example, thin films of crystalline substances such as MnBi, MnAlGe and MnCuBi, monocrystalline substances such as GdIG, BiSmErGaIG and BiSmYbCoGeIG, and amorphous substances such as GdCo, GdFe, TbFe, DyFe, GdFeBi, CdTbFe, GdFeCo and TbFeCo can be used. Among these thin films, a recording layer made mainly of a rare earth metal-transition metal alloy is most preferred from viewpoints of sensitivity, C/N and the like.

When the optical recording medium of the present invention includes a phase changeable type recording medium as the recording layer, various Te-based alloys or Te-free alloys (i.e., non-Te alloyes) or dyes can be used.

When the optical recording medium of the present invention is a magneto-optical recording medium, a thin film as a dielectric protective layer is generally provided at a location adjacent to the recording layer in such a configuration that the recording layer is sandwiched. As the dielectric protective layer which can be used in the present invention, dielectric oxides, nitrides or sulfides, such as $SiO_x$, $SiN_x$, $AlN_x$, SiAlON and ZnS are preferred. Of these, silicon nitride as described in JP-A-59-121368 is most preferred from viewpoints of optical characteristics and protective function.

When the optical recording medium of the present invention is a magneto-optical recording medium, the thickness of the recording layer is usually 200 to 2,000 Å and preferably 220 to 350 Å. The thickness of the dielectric protective layer is usually 200 to 2,000 Å and is preferably such that the thickness of the dielectric protective layer at the side of the substrate relative to the recording layer is 600 to 1,500 Å and the thickness of the dielectric protective layer on the opposite side is 220 to 500 Å.

In the above magneto-optical recording medium, each layer to be provided on the substrate is formed preferably by the vacuum film forming method and usually by the sputtering method.

By using a thin film of an alloy and Al and at least one metal selected from the elements of Groups Ib, IIb, IVb, Vb, VIb, IIIa, IVa; and Va of the Periodic Table as the metal reflective layer, anti-corrosion properties of the metal reflective layer are increased, and the protective effect of the recording layer is increased. Therefore, a optical recording medium having excellent weather resistance can be obtained.

When the metal selected from the elements of Groups Ib, IIb, IVb, Vb, VIb, IIIa, IVa and Va of the Periodic Table is Nb, Zr, V, Mo, Hf, W or Au, and the proportion of the metal is controlled to 0.5 to 20 atom %, the effects of the present invention are particularly enhanced.

When the metal selected from the elements of Groups Ib, IIb, IVb, Vb, VIb, IIIa, IVa and Va of the Periodic Table is Zn, In, Si, Pb, P, Sb or Bi, and the proportion of the metal is controlled to 0.3 to 15 atom the effects of the present invention can be enhanced.

The present invention is described in greater detail with reference to the following examples.

EXAMPLE 1

A polycarbonate substrate having a thickness of 1.2 mm and a diameter of 120 mm, with an information bit groove formed therein was produced by injection molding. On this polycarbonate substrate, a metal reflective layer having a thickness of 1,000 Å was formed by sputtering with an AlNb alloy as a target, under application of a voltage of 2.0 kW, and under an argon gas pressure of 5 m Torr to produce an ROM type optical recording medium.

ROM type optical recording medium samples were formed in which the Nb proportion in the metal reflective layer was changed within the range of 0.3 to 23 atom % by changing the charging composition of the target.

The composition of the alloy of the metal reflective layer was determined by an ICP analysis in which the metal reflective layer formed on a glass substrate placed in the sputtering room was dissolved and analyzed.

The ROM type magneto-optical recording medium samples thus obtained were measured for light reflectance at a wavelength of 633 nm by the use of a reflectance measuring apparatus using a parallel beam (initial reflectance).

Also, the reflectance after allowing the sample to stand for 1,500 hours in a thermostat vessel adjusted to 80° C. and 90% RH was measured, and a ratio of the reflectance to the initial reflectance was determined (reflectance ratio).

The results are shown in Table I-1.

TABLE I-1

| Sample | Proportion of Nb (atom %) | Initial Reflectance (%) | Reflectance Ratio | |
|---|---|---|---|---|
| I-A1 | 0.3 | 89.2 | 0.50 | Comparison |
| I-B1 | 0.5 | 87.2 | 0.83 | Invention |
| I-C1 | 5.0 | 86.5 | 0.94 | " |
| I-D1 | 10.0 | 85.2 | 0.98 | " |
| I-E1 | 15.0 | 83.5 | 1.0 | " |
| I-F1 | 20.0 | 72.4 | 1.0 | " |
| I-G1 | 23.0 | 61.6 | 1.0 | Comparison |

COMPARATIVE EXAMPLE I-1

An ROM type optical recording medium was produced in the same manner as in Example I-1 except that 99.9995% Al was used as the target.

The initial reflectance was 89.6%, and the reflectance ratio was 0.36.

From the above results, it can be seen that the metal reflective layer of the optical recording medium of the present invention in Example I-1 exhibits small reflectance, even if it is allowed to stand for a long time under high temperature and high humidity conditions, as compared with the optical recording medium of Comparative Example I-1.

EXAMPLE I-2

Eight polycarbonate substrates having a thickness of 1.2 mm and a diameter of 130 mm in which guide grooves had been formed by injection molding were placed on a rotary substrate holder. By application of magnetron sputtering in which an electric power of 1.5 kW was applied under an argon pressure of 5 m Torr, a 1,000 Å thick SiN thin film was formed as the first dielectric protective layer, a 300 Å TbFeCo thin film was formed no the SiN thin film as a recording layer, and further a 500 Å thick SiN thin film was formed on the TbFeCo thin film as the second dielectric protective layer. On the uppermost second dielectric protective layer, a thin film of AlNb alloy in which the proportion of Nb was 0.3 to 23 atom % was formed with a thickness of 500 Å to produce a metal reflective layer to obtain eight one-side-recording type magneto-optical recording media.

These media were measured for C/N ratio and Bit Error Rate (BER) (initial BER).

The media were also measured for BER after allowing them to stand for 1,500 hours with a thermostat maintained at 80° C. and 90% RH, and the ratio of the BER to the above initial BER (BER ratio) was then determined.

C/N was measured under conditions of 1,800 rpm and a carrier frequency of 3.7 MHz.

BER was measured by the use of a recording reproduction evaluation apparatus.

The results are shown in Table I-2.

TABLE I-2

| Sample | Proportion of Nb (atom %) | C/N (dB) | Initial BER ($\times 10^{-6}$) | BER Ratio | |
|---|---|---|---|---|---|
| I-A2 | 0.3 | 49.1 | 0.92 | 8.7 | Comparison |
| I-B2 | 0.5 | 48.6 | 1.1 | 1.9 | Invention |
| I-C2 | 5.0 | 48.2 | 1.0 | 1.2 | " |
| I-D2 | 10.0 | 48.6 | 0.99 | 1.0 | " |
| I-E2 | 15.0 | 47.1 | 0.98 | 1.0 | " |
| I-F2 | 20.0 | 45.9 | 0.96 | 1.0 | " |
| I-G2 | 23.0 | 43.6 | 0.98 | 1.0 | Comparison |

COMPARATIVE EXAMPLE I-2

A one-side-recording type optical recording medium was produced in the same manner as in Example I-2 except that 99.90995% Al was used as the target.

C/N was 49.3, the initial BER was $1.0 \times 10^{-6}$, and BER ratio was not less than 100.

From the above results, it can be seen that the magneto-optical recording medium of the present invention in Example I-2 displayed a very small increase of BER even when it was allowed to stand for a long time under high temperature and high humidity conditions, as compared with the magneto-optical recording medium of Comparative Example I-2.

EXAMPLE I-3

On the metal reflective layer of each one-side-recording type magneto-optical recording medium obtained in Example I-2, an ultraviolet ray hardening resin #SD-17 (produced by Dainippon Ink Co., Ltd.) was coated by a spin coating method at a thickness of 10 μm, and hardened by irradiating with ultraviolet rays for one minute at an intensity of 100 mW/cm by the use of a high pressure mercury lamp to form an organic resin protective layer.

A hot melt adhesive #XW-13 (produced by Toa Gosei Co., Ltd.) was melted at 160° C. and coated on this organic resin protective layer at a thickness of 10 μm by the use of a roll coater. Two one-side-recording type magneto-optical recording media were bonded together to obtain a double-side-recording type magneto-optical recording medium.

Each medium thus obtained was measured for C/N ratio and Bit Error Rate (BER) (initial BER).

Then, each medium was measured for BER after allowing it to stand for 3,000 hours with a thermostat maintained at 80° C. and 90% RH, and the ratio of the BER to the Initial BER was determined (BER).

The results are shown in Table I-3.

TABLE I-3

| Sample | Proportion of Nb (atom %) | C/N (dB) | Initial BER ($\times 10^{-6}$) | BER Ratio | |
|---|---|---|---|---|---|
| I-A3 | 0.3 | 49.1 | 1.9 | 20.0 | Comparison |
| I-B3 | 0.5 | 48.6 | 0.99 | 1.8 | Invention |
| I-C3 | 5.0 | 48.2 | 1.6 | 1.3 | " |
| I-D3 | 10.0 | 48.6 | 0.98 | 1.1 | " |
| I-E3 | 15.0 | 47.1 | 0.98 | 1.0 | " |
| I-F3 | 20.0 | 45.9 | 1.0 | 1.0 | " |
| I-G3 | 23.0 | 43.6 | 1.0 | 1.0 | Comparison |

COMPARATIVE EXAMPLE I-3

A double-side-recording type optical recording medium was prepared in the same manner as in Example I-3 kexcept that as a one-side-recording type magneto-optical recording medium, the medium of Comparative Example I-2 was used.

C/N was 49.3, the initial BER was $1.2 \times 10^{-6}$, and BER ratio was not less than 100.

From the above results, it can be seen that the magneto-optical recording medium of the present invention in Example I-3 displays a very small increase in BER even if allowed to stand for a long time under high temperature and high humidity conditions, as compared with the magneto-optical recording medium of Comparative Example I-3.

EXAMPLE I-4

A one-side-recording type magneto-optical recording medium was prepared in the same manner as in Example I-2 except that an AlMo alloy was used as the target, and a double-side-recording type magneto-optical recording medium was prepared in the same manner as in Example I-3.

Then, C/N and weather resistance were evaluated by the same method as in Example I-3.

The results are shown in Table I-4.

TABLE I-4

| Sample | Proportion of Mn (atom %) | C/N (dB) | Initial BER ($\times 10^{-6}$) | BER Ratio | |
|---|---|---|---|---|---|
| I-A4 | 0.3 | 48.4 | 0.96 | 26.5 | Comparison |
| I-B4 | 0.5 | 48.6 | 0.95 | 1.9 | Invention |
| I-C4 | 5.0 | 47.8 | 1.4 | 1.4 | " |
| I-D4 | 10.0 | 47.0 | 0.99 | 1.1 | " |
| I-E4 | 15.0 | 46.7 | 0.99 | 1.0 | " |
| I-F4 | 20.0 | 45.6 | 0.99 | 1.0 | " |
| I G4 | 23.0 | 42.1 | 0.99 | 1.0 | Comparison |

COMPARATIVE EXAMPLE I-4

A double-side-recording type magneto-optical recording medium was prepared in the same manner as in Example I-3 except that as a one-side-recording type magneto-optical recording medium the medium of Comparative Example I-2 was used.

C/N was 49.1, the initial BER was $9.9 \times 10^{-7}$, and BER ratio was not less than 100.

From the above results, it can be seen that the magneto-optical recording medium of the present invention in Example I-4 displays a very small increase in BER even if allowed to stand for a long time under high temperature and high humidity conditions, as compared with the magneto-optical recording medium of Comparative Example I-4.

EXAMPLE II-1

On a polycarbonate substrate having a thickness of 1.2 mm and a diameter of 120 mm, in which information bit grooves were formed by injection molding, sputtering was applied under an argon gas pressure of 1 m Torr by applying an RF electric power of 1.0 kW on an Al-In alloy target with a diameter of 8 inch to thereby form a 1,000 Å thick metal reflective layer and to form an ROM type optical recording medium.

ROM type optical recording media in which the proportion of In in the above metal reflective layer was changed within the range of 0.1 to 15 atom % by changing the charging composition of the target were prepared.

The composition of the alloy of the metal reflective layer was determined by dissolving a metal reflective layer formed on a glass substrate placed in the same sputtering room and analyzing by an ICP analysis.

The ROM type magneto-optical recording medium thus obtained was measured for light reflectance at a wavelength of 633 nm by the use of a reflectance measuring apparatus using parallel beam (initial reflectance).

The reflectance after allowing the media to stand for 1,500 hours in a thermostat maintained at 80° C. and 90% RH was measured, and the ratio of the reflectance to the above initial reflectance was determined (reflectance ratio).

The results are shown in Table II-1.

TABLE II-1

| Sample | Proportion of In (atom %) | Initial Reflectance (%) | Reflectance Ratio | |
|---|---|---|---|---|
| II-A1 | 0.1 | 89.2 | 0.74 | Comparison |
| II-B1 | 0.3 | 88.4 | 0.94 | Invention |
| II-C1 | 1.0 | 87.7 | 0.97 | " |
| II-D1 | 2.0 | 87.2 | 0.98 | " |
| II-E1 | 5.0 | 84.3 | 1.0 | " |
| II-F1 | 15.0 | 73.4 | 1.0 | " |
| II-G1 | 20.0 | 64.6 | 1.0 | " |

COMPARATIVE EXAMPLE II-1

An ROM type optical recording medium was prepared in the same manner as in Example II-1 except that 99.9995% Al was used as the target.

Initial reflectance was 98.6%, and reflectance ratio was 0.36.

From the above results, it can seen that the optical recording medium of the present invention in Example II-1 exhibits a small reduction of reflectance of the metal reflective layer even if allowed to stand for a long time under high temperature and high humidity conditions, as compared with the optical recording medium of Comparative Example II-1.

EXAMPLE II-2

Eight polycarbonate substrates having a thickness of 1.2 mm and a diameter of 130 mm in which guide grooves were formed by injection molding were placed on a rotary substrate holder. On the substrate, magnetron sputtering was applied by applying an RF electric power of 1.0 kW to the target under an argon gas pressure of 1 m Torr to thereby form a 1,000 Å thick SiN thin film as the first dielectric protective layer, then a 300 Å TbFeCo thin film as a recording layer on the SiN thin film, and further a 500 Å thick SiN thin film on the TbFeCo thin film as the second dielectric protective layer. On the uppermost second dielectric protective layer, a thin film of Al-In alloy in which the proportion of In was 0.1 to 20 atom % was formed in a thickness of 500 Å to thereby obtain a one-side-recording type magneto-optical recording medium.

Each medium was measured for C/N ratio and Bit Error Rate (BER) (initial BER).

BER after allowing to stand for 1,500 hours with a thermostat maintained at 80° C. and 90% RH was measured, and the ratio of the reflectance to the above initial BER was determined (BER ratio).

C/N was measured under conditions of 1,800 rpm and a carrier frequency of 3.7 MHz (R=30 mm).

BER was recorded with a pulse of 3.7 MHz, and the number of recorded signals dropped was calculated.

The results are shown in Table II-2.

TABLE II-2

| Sample | Proportion of In (atom %) | C/N (dB) | Initial BER ($\times 10^{-6}$) | BER Ratio | |
|---|---|---|---|---|---|
| II-A2 | 0.1 | 49.4 | 1.2 | 8.7 | Comparison |
| II-B2 | 0.3 | 49.2 | 1.4 | 1.9 | Invention |
| II-C2 | 1.0 | 49.0 | 1.0 | 1.2 | " |
| II-D2 | 2.0 | 49.1 | 1.5 | 1.0 | " |
| II-E2 | 5.0 | 48.7 | 1.1 | 1.0 | " |
| II-F2 | 15.0 | 47.1 | 1.2 | 1.0 | " |
| II-G2 | 20.0 | 45.6 | 1.4 | 1.0 | " |

COMPARATIVE EXAMPLE II-2

A one-side-recording optical recording medium was prepared in the same manner as in Example II-2 except that 99.9995% Al was used as the target.

C/N was 49.3, the initial BER was $1.0 \times 10^{-6}$, and BER ratio was not less than 100.

From the above results, it can be seen that the magneto-optical recording medium of the present invention in Example II-2 exhibits a very small increase in BER even if allowed to stand for a long time under high temperature and high humidity conditions, as compared with the magneto-optical recording medium of Comparative Example II-2.

EXAMPLE II-3

On the metal reflective layer of the one-side-recording type magneto-optical recording medium obtained in Example II-2, an ultraviolet ray hardening resin (#SD-17 produced by Dainippon Ink Co., Ltd.) was coated at a thickness of 10 μm using a spin coating method and then hardened by irradiating with ultraviolet ray for one minute at an intensity of 100 mW cm² by the use of a high pressure mercury lamp to form an organic resin protective layer.

Then, a hot melt adhesive (#PS-45-20 produced by ACI Japan Co., Ltd.) was melted at 130° C. and coated on the organic resin protective layer at a thickness of 10 μm by the use of a roll coater. Two one-side-recording type magneto-optical recording media thus obtained were bonded together to form a double-side-recording type magneto-optical recording medium.

Each medium was measured for C/N ratio and Bit Error Rate (BER) (initial BER).

BER after allowing to stand for 3,000 hours with a thermostat maintained at 80° C. and 90% RH was measured, and the ratio of the BER to the initial BER was determined (BER ratio).

TABLE II-3

| Sample | Proportion of In (atom %) | C/N (dB) | Initial BER ($\times 10^{-6}$) | BER Ratio | |
|---|---|---|---|---|---|
| II-A3 | 0.1 | 49.4 | 1.0 | 14.0 | Comparison |
| II-B3 | 0.3 | 49.2 | 0.99 | 2.1 | Invention |
| II-C3 | 1.0 | 49.0 | 1.3 | 1.3 | " |
| II-D3 | 2.0 | 49.1 | 0.98 | 1.1 | " |
| II-E3 | 5.0 | 48.7 | 0.98 | 1.0 | " |
| II-F3 | 15.0 | 47.1 | 1.2 | 1.0 | " |
| II-G3 | 20.0 | 45.6 | 0.98 | 1.0 | " |

COMPARATIVE EXAMPLE II-3

A double-side-recording type optical recording medium was prepared in the same manner as in Example II-3 except that a one-side-recording type optical recording medium of Comparative Example 2 was used as a one-side-recording type magneto-optical recording medium.

C/N was 49.3, the initial BER was $1.2 \times 10^{-6}$, and BER ratio was not less than 100.

From the above results, it can be seen that the magneto-optical recording medium of the present invention in Example II-3 displays a very small increase in BER even if allowed to stand for a long time under high temperature and high humidity conditions as compared with the magneto-optical recording medium of Comparative Example II-3.

EXAMPLE II-4

A one-side-recording type magneto-optical recording medium was prepared in the same manner as in Example II-2 except that an Al-Zn alloy was used as the target, and a double-side-recording type magneto-optical recording medium was prepared in the same manner as in Example II-3.

Then, C/N and weather resistance were measured in the same manner as in Example II-3.

The results are shown in Table II-4.

TABLE II-4

| Sample | Proportion of Zn (atom %) | C/N (dB) | Initial BER ($\times 10^{-6}$) | BER Ratio | |
|---|---|---|---|---|---|
| II-A4 | 0.1 | 49.1 | 0.96 | 20.0 | Comparison |
| II-B4 | 0.3 | 48.8 | 0.95 | 3.1 | Invention |
| II-C4 | 1.0 | 48.6 | 1.4 | 1.5 | " |
| II-D4 | 2.0 | 48.3 | 0.99 | 1.2 | " |
| II-E4 | 5.0 | 47.4 | 0.99 | 1.1 | " |
| II-F4 | 15.0 | 46.2 | 0.99 | 1.0 | " |
| II-G4 | 20.0 | 44.9 | 0.99 | 1.2 | " |

COMPARATIVE EXAMPLE II-4

A double-side-recording type optical recording medium was prepared in the same manner as in Example II-3 except that the medium of Comparative Example II-2 was used as a one side-recording type magneto-optical recording medium.

C/N was 49.3, the initial BER was $1.1 \times 10^{-6}$, and BER ratio was not less than 100.

From the above results, it can be seen that the magneto-optical recording medium of the present invention in Example II-4 displays a very small increase in BER even if allowed to stand for a long time under high temperature and high humidity conditions, as compared with the magneto-optical recording medium of Comparative Example II-4.

While the invention has been described in detail and with reference to specific embodiments thereof, it will be apparent to one skilled in the art that various changes and modifications can be made therein without departing from the spirit and scope thereof.

What is claimed is:

1. An optical recording medium comprising a substrate and an anti-corrosion metal reflective layer, wherein the metal reflective layer comprises an alloy of aluminum and 0.3 to 20 atom % of at least one metal selected from the elements of Groups Ib, IIb, IVb, Vb, VIb, IIIa, IVa and Va of the Periodic Table.

2. The optical recording medium as claimed in claim 1, wherein the metal reflective layer comprises an alloy of Al and at least one metal selected from the group consisting of Nb, Zr, V, Mo, Hf, W and Au, the proportion of said metal being 0.5 to 20 atom %.

3. The optical recording medium as claimed in claim 1, wherein the metal reflective layer comprises an alloy of Al and at least one metal selected from the group consisting of Zn, In, Si, Pb, P, Sb and Bi, the proportion of said metal being 0.3 to 15 atom %.

4. The optical recording medium as claimed in claim 1, wherein an organic resin protective layer is provided on the metal reflective layer.

5. The optical recording medium as claimed in claim 1, wherein the metal reflective layer has a thickness of 200 to 2,000 Å.

6. An optical recording medium as described in claim 1, wherein the aluminum in said alloy is replaced by a metal selected from the group consisting of iron, copper, nickel, titanium and chromium.

7. A double-side recording type optical recording medium comprising two optical recording media bonded together with a hot melt adhesive, wherein each of said optical recording media includes a substrate, a corrosion resistant metal reflective layer and an organic resin protective layer and the protective layers of said media are bonded together so that the substrates form the outermost layers of the double-side recording type optical recording medium, each said corrosion resistant metal reflective layer comprising an alloy of aluminum and 0.3 to 20 atom % of at least one metal selected from the elements of Groups Ib, IIb, IVb, Vb, IIIa, IVa and Va of the Periodic Table.

8. The double-side-recording type optical recording medium as claimed in claim 7, wherein the metal reflective layer comprises an alloy of Al and at least one metal selected from the group consisting of Nb, Zr, V, Mo, Hf, W and Au, the proportion of said metal being 0.5 to 20 atom %.

9. The double-side-recording type optical recording medium as claimed in claim 7, wherein the metal reflective layer comprises an alloy of Al and at least one metal selected from the group consisting of Zn, In, Si, Pb, P, Sb and Bi, the proportion of said metal being 0.3 to 15 atom %.

10. The double-side-recording type optical recording medium as claimed in claim 7, wherein the hot melt adhesive is at least one resin selected from the group consisting of synthetic rubber-based, EVA-based, acryl-based, and polyamide-based.

11. The double-side-recording type optical recording medium as claimed in claim 7, wherein the metal reflective layer has a thickness of 200 to 2,000 Å.

12. A double-side recording type optical recording medium as described in claim 7, wherein the aluminum in said alloy is replaced by a metal selected from the group consisting of iron, copper, nickel, titanium and chromium.

* * * * *